July 20, 1937.  M. MUELLER-CUNRADI ET AL  2,087,616
OPERATING INTERNAL COMBUSTION ENGINES
Filed July 21, 1933
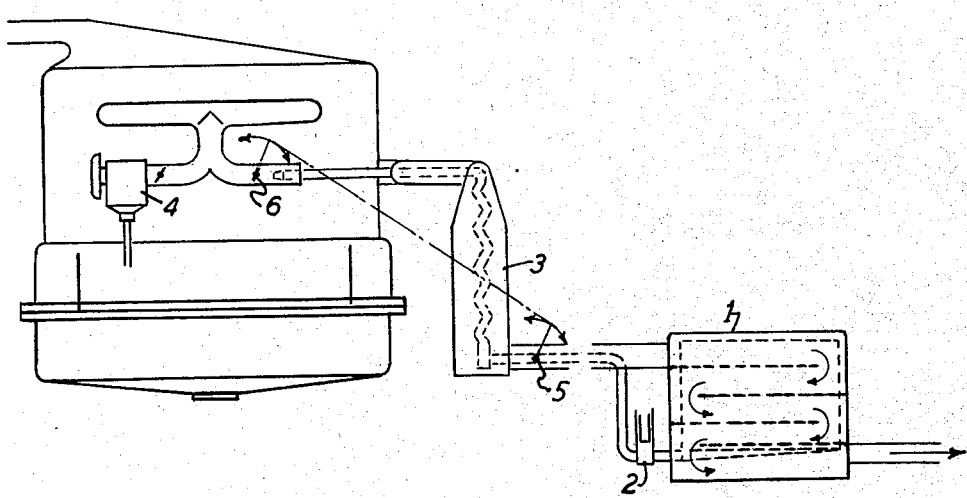
INVENTORS
MARTIN MUELLER-CUNRADI
MICHAEL OTTO
BY Hauff Warland
ATTORNEYS.

Patented July 20, 1937

2,087,616

UNITED STATES PATENT OFFICE 2,087,616

OPERATING INTERNAL COMBUSTION ENGINES

Martin Mueller-Cunradi and Michael Otto, Ludwigshafen-on-the-Rhine, Germany, assignors to I. G. Farbenindustrie Aktiengesellschaft, Frankfort-on-the-Main, Germany Application July 21, 1933, Serial No. 681,444
In Germany July 22, 1932

6 Claims. (Cl. 44—9)

The operation of internal combustion engines is attended, by reason of the ready inflammability of the fuel, by certain dangers which in vehicles, especially in aeroplanes and airships, may lead to serious results.

We have now found that to a great extent, or even practically completely, the said dangers can be obviated by employing as fuel liquid to solid combustible carbonaceous substances which are readily depolymerizable, and splitting the same into substances of low molecular weight by heat, as for example with the aid of the exhaust gases, and by supplying the split products to the combustion chamber. Substances of the said kind are for example the polymerization products of isobutylene. Isobutylene may be polymerized in various ways, as for example with dilute sulphuric acid, preferably at a temperature between 50° and 100° C., or with alkaline bleaching earths and especially with volatile inorganic halogen compounds, preferably at a temperature between 80° below zero C. and 50° C., to yield polymers having a great variety of molecular sizes and having the property of being converted by heating, if desired in the presence of catalysts, into substances of low molecular weight, i. e. into isobutylene or its lower polymers. Preferably a substantial part of products having a molecular weight below 200 should be formed. The initial substances to be depolymerized preferably have a molecular weight above 400, and of particular advantage those substances are employed which have a molecular weight above 1000. But also depolymerizable substances having a molecular weight less than 400 can be used, as may be seen from some of the examples given below.

Very good results are obtained with the high molecular polymerization products of isobutylene which are prepared by causing boron fluoride to act on isobutylene in the cold. Oily to viscous solid masses are obtainable depending on the conditions. If these polymerization products be employed as fuel and they are first led into a heating chamber which is heated by exhaust gases, preferably to a temperature above 300° C., they are depolymerized to give their lower polymers which are supplied to the combustion chamber in admixture with air. When employing strongly viscous or solid substances of high molecular weight it is preferable to warm the same before they are supplied to the splitting vessel so that they become mobile or capable of being pumped. These substances have flashpoints up to 300° C. so that when using them the danger of an ignition in the fuel reservoir is practically excluded.

Hydrogenation products of rubber, the so-called hydro-rubber, which have different molecular sizes depending on their method of preparation, are also very suitable.

Also tri-isobutylene may be mentioned which is obtainable by the action of approximately 70 per cent sulphuric acid on isobutylene and which has a boiling point of 175° C. and a flashpoint of 32° C. If this tri-isobutylene be employed as fuel and it is first led into a heating chamber which is heated by exhaust gases, it is depolymerized to give isobutylene and di-isobutylene which are supplied to the combustion chamber in admixture with air.

Furthermore combustible substances of high molecular weight containing oxygen may be employed. Thus for example diacetone alcohol which has a flashpoint of about 67° C. is suitable. The depolymerization is preferably favoured in this case by the employment of catalysts, as for example pumice stone impregnated with soda lime. In the presence of this catalyst diacetone alcohol is decomposed into acetone at a temperature of 200° C.

The aldol of isobutyraldehyde is another suitable depolymerizable compound containing oxygen. If this be brought into a decomposition chamber heated to about 150° C., it is depolymerized to give isobutyraldehyde which is supplied to the cylinders.

Further examples are the polymerization products of styrene which may be converted into polymers of different molecular sizes in various ways, as for example by protracted heating preferably to a temperature above 300° C. These substances are also readily depolymerizable and may be employed in the same way for operating internal combustion engines.

If catalysts are employed for the depolymerization of the polymerization products, they may be added directly to the product or they may be introduced into the decomposition chamber or applied to the inner surface. In addition to those already mentioned a suitable catalyst is for example phosphoric acid.

In order to be able to start the engine in the cold state, special means are necessary. For example an auxiliary fuel, such as benzine, may be employed until the engine has warmed up. It is also satisfactory to bring the decomposition chamber to the necessary temperature by electrical heating, heating cartridges or by burning benzine or petroleum.

The following example, which is given with reference to the accompanying drawing which shows an arrangement of apparatus according to this invention, will further illustrate the nature of this invention but the invention is not restricted to this example or the particular arrangement shown.

Example

The storage tank 1 of a petrol engine is rendered capable of being heated by the provision of heating means through which flow the exhaust gases or hot cooling water; instead of a vaporizer, a decomposition chamber 3 is provided which is heated by exhaust gases and to which the fuel is supplied from the storage tank 1 by means of a dosing pump 2. From the chamber 3, the decomposition products formed pass, while simultaneously sucking in air with which the decomposition products mix, into the cylinders of the engine. In addition to the said means, the engine is provided with an auxiliary tank for petrol with the usual fuel supply and vaporizer 4.

The fuel tank 1 is filled with a polymerization product of isobutylene having a molecular weight of about 5000 which is rendered mobile by heating to about 100° C. The engine is started by means of the petrol contained in the auxiliary tank, and the exhaust gases from the engine are passed through the heating means in the storage tank and also into the decomposition chamber 3. A temperature of about 100° C. should be maintained in the storage tank and the inner walls of the decomposition chamber should be at about 350° C. As soon as the said temperatures are attained, the dosing pump 2 is started; this pumps the viscous fuel to the decomposition chamber 3 where it is decomposed into a mixture of isobutylene and its lower polymers which is mixed with the air necessary for combustion and sucked in by the pistons of the cylinders. As soon as this is the case, the auxiliary tank is shut off. The engine operates without difficulty, it is found that the fuel so produced has a very high compression value. The regulation of the supply of fuel is effected by means of a regulating valve 5 which is coupled with a throttle flap 6.

What we claim is:—

1. A process for driving an internal combustion engine without risks incident to the fuel catching fire which comprises using as a source of fuel a polymerizable combustible hydrocarbon substance consisting of hydrogen and carbon only which is bound in the form of a non-explosive polymer thereof having a mean molecular weight of more than 400 and capable of being depolymerized upon heating to liberate said substance, passing said polymer to the engine through a heated passage way, thereby depolymerizing said polymer in said passage way to liberate said combustible substance, and then injecting this substance into the engine.

2. A process for driving an internal combustion engine without risks incident to the fuel catching fire which comprises using as a source of fuel a polymerizable combustible hydrocarbon substance consisting of hydrogen and carbon only which is bound in the form of a non-explosive polymer thereof having a mean molecular weight of more than 1000 and capable of being depolymerized upon heating to liberate said substance, passing said polymer to the engine through a heated passage way, thereby depolymerizing said polymer in said passage way to liberate said combustible substance, and then injecting this substance into the engine.

3. A process for driving an internal combustion engine without risks incident to the fuel catching fire which comprises passing a combustible substance selected from the group consisting of hydrogenation products of rubber and polymerization products of isobutylene and styrene through a heated passage way, thereby depolymerizing said substance in said passage way to liberate a product of low molecular weight and then injecting said product into the engine.

4. A process for driving an internal combustion engine which comprises depolymerizing by the action of heat a from liquid to solid combustible hydrocarbon substance consisting of hydrogen and carbon only selected from the group consisting of hydrogenation products of rubber and polymerization products of isobutylene and styrene, and supplying the depolymerized products to the combustion chamber of said engine.

5. A process for driving an internal combustion engine which comprises depolymerizing by the action of heat a from liquid to solid combustible, depolymerizable hydrocarbon substance consisting of hydrogen and carbon only having a mean molecular weight of more than 400 in such a manner that a substantial part of said substance is converted into products having a molecular weight below 200, and supplying the depolymerized products to the combustion chamber of said engine.

6. A process for driving an internal combustion engine which comprises depolymerizing by the action of heat a from liquid to solid combustible, depolymerizable hydrocarbon substance consisting of hydrogen and carbon only having a mean molecular weight of more than 1000 in such a manner that a substantial part of said substance is converted into products having a molecular weight below 200, and supplying the depolymerized products to the combustion chamber of said engine.

MARTIN MUELLER-CUNRADI.
MICHAEL OTTO.